United States Patent
Kukal et al.

(10) Patent No.: US 10,467,370 B1
(45) Date of Patent: Nov. 5, 2019

(54) METHODS, SYSTEMS, AND COMPUTER PROGRAM PRODUCT FOR IMPLEMENTING A NET AS A TRANSMISSION LINE MODEL IN A SCHEMATIC DRIVEN EXTRACTED VIEW FOR AN ELECTRONIC DESIGN

(71) Applicant: Cadence Design Systems, Inc., San Jose, CA (US)

(72) Inventors: Taranjit Singh Kukal, New Delhi (IN); Arnold Jean Marie Gustave Ginetti, Antibes (FR); Preeti Chauhan, Moradabad (IN); Nikhil Gupta, New Delhi (IN); Vikas Aggarwal, Faridabad (IN); Vikrant Khanna, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 198 days.

(21) Appl. No.: 15/721,851

(22) Filed: Sep. 30, 2017

(51) Int. Cl.
   *G06F 17/50* (2006.01)
   *H05K 3/00* (2006.01)

(52) U.S. Cl.
   CPC ...... *G06F 17/5068* (2013.01); *G06F 17/5036* (2013.01); *G06F 17/5077* (2013.01); *H05K 3/0005* (2013.01); *G06F 17/5072* (2013.01); *G06F 17/5081* (2013.01); *G06F 2217/02* (2013.01); *G06F 2217/74* (2013.01)

(58) Field of Classification Search
   None
   See application file for complete search history.

(56) References Cited

U.S. PATENT DOCUMENTS

| | | | |
|---|---|---|---|
| 6,236,956 B1 | 5/2001 | Mantooth | |
| 6,366,874 B1 | 4/2002 | Lee | |
| 6,865,725 B2 * | 3/2005 | Dickey | G06F 17/5077 716/111 |
| 7,089,512 B2 | 8/2006 | Iadanza | |
| 7,120,893 B2 * | 10/2006 | Sasaki | G06F 17/5036 716/115 |

(Continued)

OTHER PUBLICATIONS

C.-C. Huang et al., "Extraction of Accurate Package Models from VNA Measurements," 2000 IEEE/CMPT Int'l Electronics Manufacturing Technology Symposium, pp. 55-59. (Year: 2000).*

(Continued)

*Primary Examiner* — Leigh M Garbowski
(74) *Attorney, Agent, or Firm* — Vista IP Law Group, LLP

(57) ABSTRACT

Disclosed are methods, systems, and articles of manufacture for implementing a schematic circuit design component as a transmission line model in a schematic driven extracted view for an electronic design. These techniques identify a schematic circuit component design form a schematic design of an electronic design and identify or determine layout device information of a layout circuit component design corresponding to the schematic circuit component design. An extracted view may be generated or identified for the electronic design at least by using a transmission line model based in part or in whole upon connectivity information or a hierarchical structure of the electronic design. The electronic design may then be modified or updated based in part or in whole upon results of performing one or more analyses on the extracted view with the transmission line model.

20 Claims, 19 Drawing Sheets

(56) References Cited

U.S. PATENT DOCUMENTS

| | | |
|---|---|---|
| 7,159,202 B2 | 1/2007 | Lee |
| 7,206,731 B2 | 4/2007 | Sercu |
| 7,418,683 B1 | 8/2008 | Sonnard |
| 7,451,069 B2 | 11/2008 | Moosburger |
| 8,176,463 B2 | 5/2012 | O'Riordan |
| 8,209,650 B2 | 6/2012 | St. John |
| 8,261,228 B1 | 9/2012 | Gopalakrishnan |
| 8,584,072 B1 | 11/2013 | Gopalakrishnan |
| 8,612,921 B1 | 12/2013 | Gopalakrishnan |
| 8,656,329 B1 * | 2/2014 | Kukal .................. G06F 17/5036 716/108 |
| 8,689,169 B2 | 4/2014 | Fischer |
| 8,707,230 B1 | 4/2014 | Hu |
| 8,726,207 B2 | 5/2014 | Jiang |
| 8,732,636 B2 | 5/2014 | Ginetti |
| 8,732,640 B1 | 5/2014 | Krishnan |
| 8,762,906 B2 | 6/2014 | Ginetti |
| 8,782,577 B2 | 7/2014 | Fischer |
| 9,223,915 B1 | 12/2015 | Ginetti |
| 9,245,073 B2 | 1/2016 | Fu |
| 9,280,621 B1 * | 3/2016 | Ginetti ................ G06F 17/5022 |
| 9,286,421 B1 | 3/2016 | Kukal |
| 9,317,638 B1 * | 4/2016 | Banka .................. G06F 17/505 |
| 9,342,647 B2 | 5/2016 | Chen |
| 9,390,218 B2 | 7/2016 | Lee |
| 9,449,130 B1 | 9/2016 | Kukal |
| 9,645,715 B1 | 5/2017 | Jain |
| 9,779,193 B1 | 10/2017 | Ginetti |
| 9,798,840 B1 | 10/2017 | Ginetti |
| 9,881,119 B1 | 1/2018 | Kukal |
| 10,078,715 B2 | 9/2018 | Sendig |
| 10,102,324 B2 | 10/2018 | Oriordan |
| 10,289,793 B1 | 5/2019 | Kukal |
| 2004/0111688 A1 | 6/2004 | Lee |
| 2007/0094622 A1 | 4/2007 | Lee |
| 2007/0233443 A1 * | 10/2007 | Lai ...................... G06F 17/5036 703/14 |
| 2008/0244501 A1 | 10/2008 | Davison |
| 2011/0035203 A1 | 2/2011 | Dalton |
| 2015/0269297 A1 | 9/2015 | Tuan |
| 2016/0125115 A1 | 5/2016 | Strang |
| 2017/0169146 A1 | 6/2017 | Chen |
| 2017/0169156 A1 | 6/2017 | Perez |
| 2017/0249400 A1 | 8/2017 | Oriordan |
| 2017/0249410 A1 | 8/2017 | Baker |
| 2017/0255742 A1 | 9/2017 | Lee |

OTHER PUBLICATIONS

H. Ding et al., "On-Chip Millimeter-Wave Library Device—Scalable Wilkinson Power Divider/Combiner," 2007 IEEE Electronic Components and Technology Conference, pp. 1246-1251. (Year: 2007).*

H. Ding et al., "Modeling and Implementation of On-Chip Millimeter-Wave Compact Branch Line Couplers in a BiCMOS Technology ," Proceedings of the 37th European Microwave Conference, Oct. 2007, pp. 458-461. (Year: 2007).*

Final Office Action dated Sep. 19, 2019 for U.S. Appl. No. 15/721,853.

Non-Final Office Action dated Jun. 14, 2019 for U.S. Appl. No. 15/721,845.

Non-Final Office Action dated May 31, 2019 for U.S. Appl. No. 15/721,853.

* cited by examiner

METHODS, SYSTEMS, AND COMPUTER PROGRAM PRODUCT FOR IMPLEMENTING A NET AS A TRANSMISSION LINE MODEL IN A SCHEMATIC DRIVEN EXTRACTED VIEW FOR AN ELECTRONIC DESIGN

CROSS REFERENCE TO RELATED APPLICATIONS

This U.S. patent application is cross related to U.S. Pat. App. Ser. No. 15/721,845 filed concurrently and entitled "METHODS, SYSTEMS, AND COMPUTER PROGRAM PRODUCT FOR IMPLEMENTING SCHEMATIC DRIVEN EXTRACTED VIEWS FOR AN ELECTRONIC DESIGN" and U.S. Pat. App. Ser. No. 15/721,853 filed concurrently and entitled "METHODS, SYSTEMS, AND COMPUTER PROGRAM PRODUCT FOR BINDING AND BACK ANNOTATING AN ELECTRONIC DESIGN WITH A SCHEMATIC DRIVEN EXTRACTED VIEW". The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design of a layout and verification.

Circuit designers and verification engineers use different methods to verify circuit designs. One common method of verification is through simulation of the circuit design of interest. Simulation dynamically verifies a design by monitoring behaviors of the design with respect to test stimuli. For many types of designs, simulation can and should be performed during the design process to ensure that the ultimate goals are achievable and will be realized by the finished product.

SPICE (Simulation Program with Integrated Circuit Emphasis) is a common type of simulator that is used to simulate and verify the operation of an electronic design. With SPICE, the electronic design is converted into a system of equation(s), which is then solved for a given set of inputs to check the state of specific portions of the circuit at given points in time. Furthermore, capturing the electrical behaviors of a circuit design requires correctly modeling various components of a circuit design to include, for example, geometric information, parasitic information, etc. Although many vendors provide, for example, SPICE models, s-parameter models, etc. for their devices, an IC design or a system design may involve much more than merely these device models for simulation. For example, the packaging may need to be properly accommodated in such models, the traces or interconnects may need to be modeled to reflect more realistic voltage drops, etc. For many circuit designs, this process can be a very computationally expensive and time-consuming effort, especially given the size and complexity of modern circuit designs.

Conventional approaches for simulations, especially for board or system level simulations (e.g., simulations performed on an electronic system including the printed circuit board or PCB, one or more integrated circuit (IC) chips, and IC packaging thereof) often extract a static simulation view from layouts (e.g., IC layout, package layout, board layout, etc.) by identifying a corresponding schematic symbol from the schematic symbol library for each of a plurality of layout circuit devices, invoking the corresponding layout editor, and performing the extraction therein. The extraction results are then saved as some textual form (e.g., an ASCII file for a SPICE netlist). As a result, these simulation views are often termed layout extracted views or simply extracted views; and they are understandable by the simulators but not much more beyond that. That is, the graphical representations or a simplified version thereof representing how circuit components are connected may be lost in the generation of these conventional extracted views. The electronic design may then undergo multiple rounds of changes to the schematic, the layout, or both the schematic and the layout after the initial simulation has been performed with a simulation view extracted from the initial layout.

When these changes occur at the schematic level, these conventional approaches require a designer to implement the changes in the schematic of the electronic design, push these schematic changes to create an updated layout with a layout editor, and then extract an updated simulation view with the updated layout. The simulator may then perform another round of simulation with the updated simulation view. This loop not only requires much more time and computational resources but also presents multiple other problems.

For example, modern electronic design may include devices having distributed pins, vector pins, etc. that may be represented as an input pin in the schematic symbol. During a simulation of, for example, an electronic design with a distributed Vcc having multiple Vcc pins for a distributed power network, this distributed Vcc may be schematically represented as a single Vcc pin in the corresponding schematic symbol. In this example, if the simulation result for the Vcc shows abnormal behavior the designer will need to guess which Vcc pin or Vcc pins are causing the abnormal behavior or perform some trial-and-error changes to identify the true cause of the abnormal behavior. Similar problems and hence challenges also arise for vector pins which may be even more difficult to troubleshoot and identify the root source of any abnormal behavior simulation result due to the multiplicity of the pins.

Another problems with these conventional approaches is that the extracted view from a layout is a static view. These simulation views are generated by traversing a layout to identify layout component designs and devices, identify a corresponding schematic symbol for each of the layout component designs, place the schematic symbol in the simulation view, and interconnect the schematic symbols by referencing the layout connectivity. Although these simulation views may in some cases appear to be identical or substantially similar to the original schematic from which the layout is generated, these simulation views or extracted views are not editable as the original schematic. As a result, any changes at the schematic level must go through the aforementioned schematic edit, layout edit, and re-extraction.

Moreover, these simulation views are often generated for the simulation engines and thus do not appear as readable or understandable by designers. More importantly, these extracted views are generated as a flat view having a single hierarchy that includes all the schematic symbols or models understood by the simulation engine. As a result, an extracted view loses the hierarchical structures of the electronic designs; and the loss of the hierarchical structure further exacerbates the difficulties in understanding or manipulating such an extracted view, even if the extracted view were to be editable.

Another problem with conventional approaches is that the same schematic symbol may correspond to multiple schematic instances in the schematic design and hence multiple layout instances in the layout. During the generation of an extracted view from the layout in conventional approaches, these multiple layout instances may be extracted and represented as the same schematic symbol whereas these multiple layout instances may not necessarily be identically implemented in the layout. For example, two or more of these multiple layout instances may be routed differently although then all correspond to the same schematic symbol. As a result, conventional simulation views cannot correct capture the differences in, for example, parasitics and/or electrical characteristics between these layout instances.

In addition to the aforementioned problems, what actually predicts the predicted behaviors is the extracted views because these extracted views model at least the components that may affect the electrical behaviors of the underlying circuit. Nonetheless, designers and users of various electronic design tools are more used to view and interact with schematic designs because a schematic design delineates how circuit components are interconnected with each other although the schematic design may not indicate or even imply the scales or sizes of these circuit component designs. As described above, conventional extracted views are obtained from various layouts and are created in a form (e.g., ASCII file) that is understood by the simulators (e.g., SPICE simulators) but not the users, at least not in a graphical way that resembles how circuit component designs are interconnected. Although these extracted views may be back annotated or associated with the underlying schematic, these extracted views are not intuitive and not understandable unless the users parse through the textual description therein. Moreover, even if users can parse through these extracted views and understand their contents, these conventional extracted views often cluttered the design space and thus provide not much value, if any at all, for users to perform their intended tasks.

At Giga-hertz (GHz) frequencies, long interconnect leads may exhibit transmission line behavior because of the fast rise/fall times of signals. Moreover, with the use of wider wires, inductive impedance ($j\omega L$) at high frequencies (e.g., microwave, RF or radio frequency, etc.) becomes comparable to the resistive component (R) of the major signal wires and power/ground nets. For copper wires, this phenomenon becomes even more prominent. Such parasitic inductance may cause additional signal delays, over-shoot waveforms, increased ground bounce, and inductive cross-talk so clock trees and the power/ground grids need to be designed more carefully to avoid large clock skew, signal inductive coupling, ground bounce, etc.

Conventional approaches merely consider the inductive effects of interconnect leads only for a few global clock wires and major signal buses. This has been proved to be insufficient because of higher clock frequencies and faster signal rise/fall times. Three-dimensional (3D) or two-and-a-half (2.5D) electromagnetic (EM) full wave field solvers are available but do not have the capacity to manage modern ICs and often become prohibitively expensive, especially those having large, complex circuits. These problems and challenges are in addition to those pertaining to conventional, layout-driven extracted views.

Thus, what are needed are methods, systems, and computer program products for implementing a net as a transmission line model in a schematic driven extracted view for an electronic design to address at least the aforementioned issues and shortcomings.

SUMMARY

Disclosed are method(s), system(s), and article(s) of manufacture for implementing a net as a transmission line model in a schematic driven extracted view for an electronic design in one or more embodiments. Some embodiments are directed at a method for implementing deadlock detection with formal verification techniques in an electronic design.

In some embodiments, these techniques identify a schematic circuit component design form a schematic design of an electronic design and identify or determine layout device information of a layout circuit component design corresponding to the schematic circuit component design. An extracted view may be generated or identified for the electronic design at least by using a transmission line model based in part or in whole upon connectivity information or a hierarchical structure of the electronic design. The electronic design may then be modified or updated based in part or in whole upon results of performing one or more analyses on the extracted view with the transmission line model.

In some of these embodiments, a new symbol may be identified or generated with appropriate interfaces for representing the schematic circuit component design in the extracted view; and one or more analysis engines may perform the one or more analyses on the extracted view.

To identify a new symbol, a plurality of transmission line model components may be identified for the schematic circuit component design; and a copy of a schematic symbol of the schematic circuit component design may be generated. This copy of the schematic symbol may be modified into the new symbol with appropriate interfaces; and the plurality of transmission line model components may be placed under the new symbol in the extracted view or associated with the new symbol.

In addition or in the alternative, a plurality of transmission line model components for the schematic circuit component design; a new schematic symbol may be generated for representing the schematic circuit component design in the extracted view; and the plurality of transmission line model components may be placed under the new schematic symbol in the extracted view or associated the plurality of transmission line model components with the new schematic symbol.

In some embodiments, identifying the schematic circuit component design may include identifying an interconnect from the schematic design; and one or more characteristics of the interconnect, the one or more characteristics comprising signal rise time, one-way signal propagation time delay, an inductive impedance, or a resistance may be further identified.

In some of these immediately preceding embodiments, the interconnect may be identified as the schematic circuit component design based at least in part upon a first ratio between the rise time and one-way signal propagation time delay or a second ratio between the inductive impedance and the resistance of the interconnect; and one or more other schematic circuit component designs may be identified for the schematic circuit component design based at least in part upon one or more electrical characteristics, one or more geometric characteristics, or one or more physical characteristics of the one or more other schematic circuit component designs.

In some embodiments, at least a part of the layout device information may be associated with the extracted view; and one or more circuit component designs corresponding to the schematic circuit component design may be identified. In addition, one or more characteristics of the one or more layout circuit component designs may be identified; and a plurality of transmission line model components corresponding to the one or more layout circuit component designs may be identified based in part or in whole upon the one or more characteristics of the one or more layout circuit component designs. The extracted view may be generated or updated at least by replacing the schematic circuit component design with a new schematic symbol in the schematic design.

In some embodiments, generating or updating the extracted view may further include placing the plurality of transmission line model components under the new schematic symbol or associating the plurality of transmission line model components with the new schematic symbol; and the new schematic symbol or the plurality of transmission line model components may be interconnected with connectivity information.

In some of the immediately preceding embodiments, a mapping data structure between at least two of the schematic design, the extracted view, a layout of the electronic design, the new schematic symbol of the transmission line model, the plurality of transmission line model components, the schematic circuit component design, or the one or more layout circuit component designs may be generated or updated.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
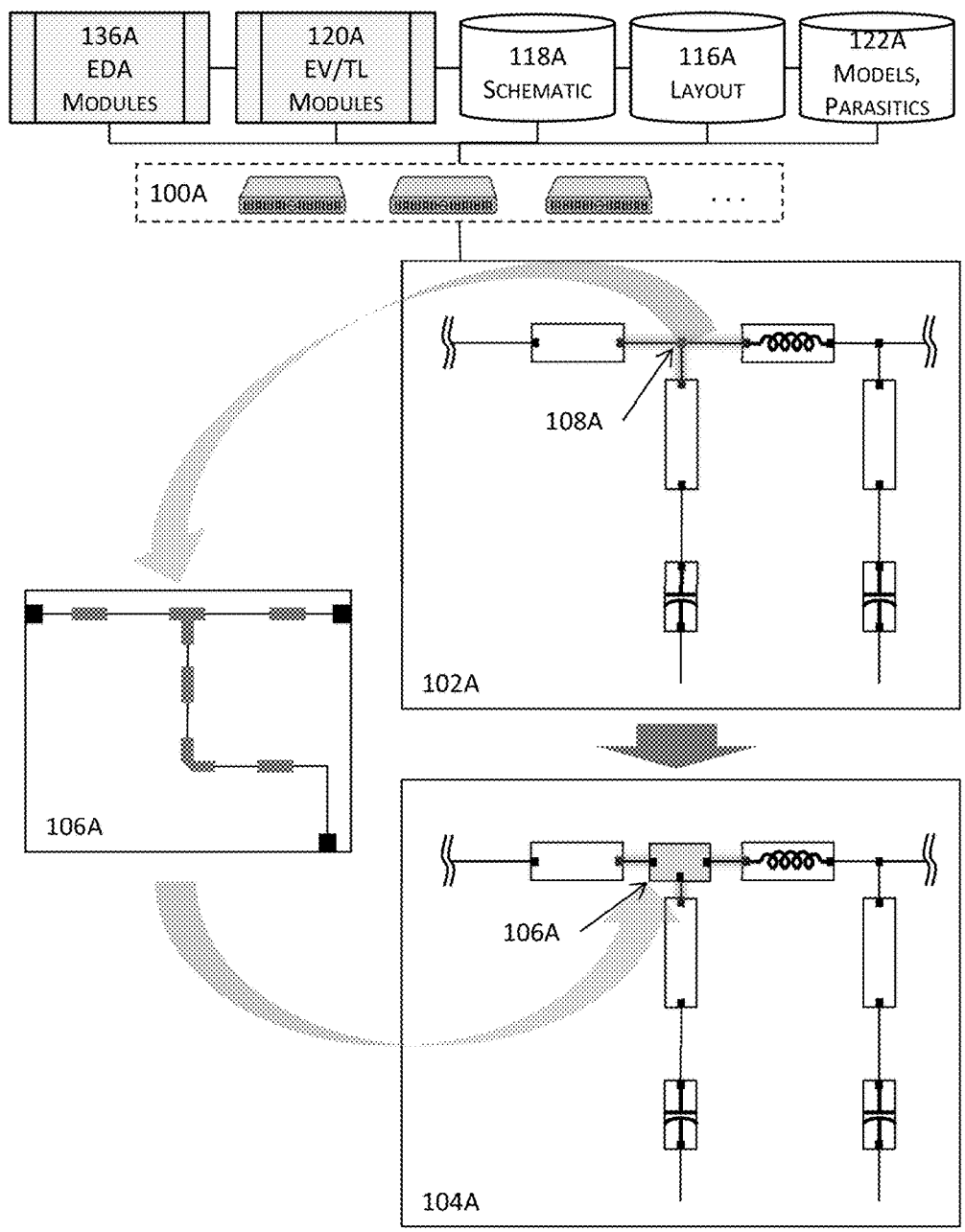
FIG. 1 illustrates a high level block diagram of a simplified system for implementing a schematic circuit design component as a transmission line model in a schematic driven extracted view for an electronic design in one or more embodiments.

Various techniques are directed to implementing a net as a transmission line model in a schematic driven extracted view for an electronic design in various embodiments. In these embodiments, a schematic circuit component design may be identified based at least in part upon one or more criteria. This identified schematic circuit component design is the target for representation with a transmission model.

Some embodiments described herein generate a schematic driven extracted view where a schematic circuit component design such as a net or a net segment is represented as a transmission line model. One or more analyses may be performed on the extracted view to predict the electrical behaviors of the underlying electronic design while more accurately capturing the transmission line effects. The accuracy of the extracted view and hence the predicted electrical behaviors may be balanced against the objective of these one or more analyses.

For example, more complex or more correct models or extracted views (and hence more computation resources) may be utilized to generate more accurate electrical behaviors. On the other hand, less complex or less correct models or extracted views (and hence less computation resources) may be utilized for preliminary studies, concept and feasibilities studies, what-if analyses, etc. that do not necessarily require such high accuracy. The electronic design may be tuned or modified based at least in part upon the results of these one or more analyses to prepare the electronic design or to finalize the electronic design for mask preparation and mask writing as well as for tapeout for the eventual manufacturing of the electronic circuits represented by the electronic design.

Unlikely conventional extracted views that are either in a textual format (e.g., a textual netlist) or in a graphical format with a random or pseudo-random arrangement of devices, an extracted view generated with the techniques described herein graphically resembles the schematic design so that users may directly operate upon the extracted view in an identical or a substantially similar manner as that for a schematic design. The schematic driven extracted view thus generated may also have a hierarchical structure that preserves the hierarchical structure of the schematic design and/or that of the layout.

Unlike conventional extracted views in a textual format or in a graphical format having randomly or pseudo-randomly scattered models and/or circuit component designs, extracted views are generated in a schematic-driven methodology. An extracted view thus generated may be associated with or bound to the original schematic design, the corresponding layout; and similar association and binding may also be established among the schematic circuit component designs, the corresponding layout circuit component designs, and the models.

Moreover, with its graphical resemblance with the corresponding schematic design and the binding or association, users may directly modify an extracted view to implement one or more changes; and the corresponding changes will be automatically populated to the original schematic and the corresponding layout. In some embodiments, such automatic population of changes can be accomplished without even invoking or having to invoke any layout editors unless the changes result in layout topology changes.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a simplified system for implementing a net as a transmission line model in a schematic driven extracted view for an electronic design in one or more embodiments. In these embodiments, a schematic design 102A including a schematic circuit component design of interest (e.g., a net of interest) 108A may be referenced to generate an extracted view upon which one or more analyses (e.g., simulations) may be performed to compute or predict the electrical behaviors of the schematic design 102A.

More specifically, one or more computing systems 100A may invoke various modules to identify the schematic circuit component of interest 108A from the schematic design 102A and identify (if already existing) or construct (if non-existing) a corresponding transmission line model 106A for the identified schematic circuit component design 108A. The identified schematic circuit component design 108A may be removed from the original schematic design 102A; and the transmission line model 106A may be placed in the schematic design 102A. This transmission line model 106A may be interconnected with flight-line segments or orthogonal line segments by using connectivity information (e.g., schematic connectivity information and/or layout connectivity information). An extracted view 104A may be generated with the transmission line model replacing the identified net of interest 108A.

Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100A for execution.

These modules may include one or more EDA (electronic design automation) modules 136A such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design for finalizing the electronic design for mask preparation and mask writing as well as for tapeout for the eventual manufacturing of the electronic circuits represented by the electronic design.

These models may also include extracted view modules 120A that may include, for example, 3D and/or 2.5D modeling tools to model various components in the 3D or 2.5D space, extraction modules to extract geometric, physical, and/or electrical characteristics, properties, or attributes from various sources (e.g., layouts, SEM or scanning electron microscope photos, etc.), meshing module(s) to discretize an area or a volume into a plurality of meshes, and/or one or more geometry simplification or reduction modules to simplify geometries by approximating more complex geometries with simpler geometries (e.g., by approximating a curve with a plurality of straight segments depending upon the resource requirements and/or the accuracy requirements).

The extracted view and transmission line modules 120A may also include one or more EM (electromagnetic) field solver modules, heuristic solver modules, and/to empirical formula solver modules to solve for the electrical behavior of an underlying electronic circuit. The extracted view and transmission line modules 120A may further include a pre-layout exploration module that estimates the characteristics, attributes, and/or properties of a circuit component design, without invoking any layout editors.

These one or more computing systems 100A may further access a schematic design database 118A and a layout database 116A when generating an extracted view from a schematic design of an electronic design. A plurality of models (e.g., SPICE sub-circuits, IBIS models, s-parameter models, etc.) and/or parasitic data 122A may also be stored and made available to these one or more computing systems.

For example, some embodiments may store parasitic data of some parameterized, pre-existing, or pre-characterized electronic circuit component designs in a tabular structure (e.g., a database) so that these one or more computing systems, when modeling an electronic circuit component design as model in an extracted view, may look up the parasitic data, model data, or even a parameterized model for a substantially similar or previously characterized electronic circuit component design so that these one or more computing systems 100A no longer need to expend as much or any computational resources in constructing the model for the electronic circuit component design.

Figure 2A:
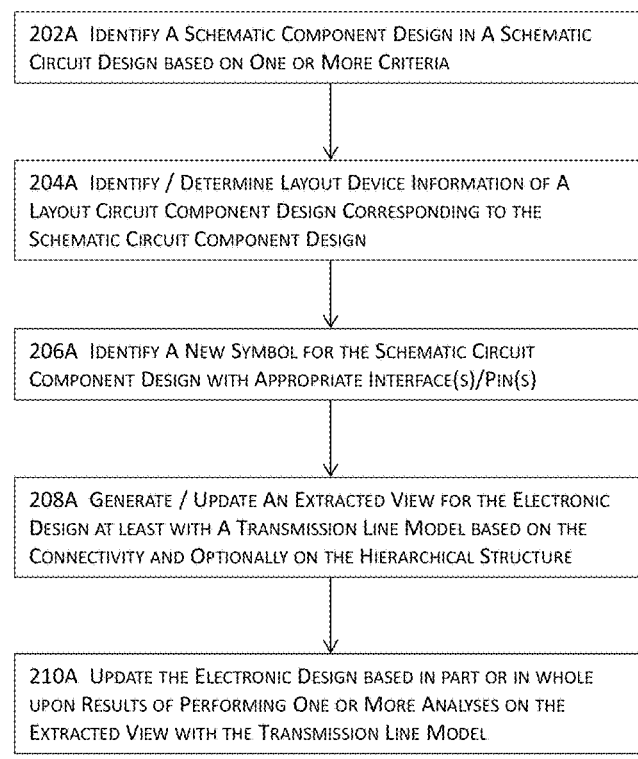
FIG. 2A illustrates a high level block diagram for implementing a net as a transmission line model in a schematic driven extracted view for an electronic design in one or more embodiments.

FIG. 2A illustrates a high level block diagram for implementing a net as a transmission line model in a schematic driven extracted view for an electronic design in one or more embodiments. A schematic circuit component design may be identified at 202A based in part or in whole upon one or more criteria. These one or more criteria may include, for example, whether the schematic circuit component design may exhibit any transmission line behavior. For example, a criterion may be whether the inductive impedance (or characteristic impedance) of the schematic circuit component design becomes comparable or significant or can be ignored in comparison to the resistance of the schematic circuit component design.

Another example of such one or more criteria may include how the rise time of a signal in the schematic circuit component design is compared to the one-way propagation time delay of the signal. For example, a rule may be set up to model a schematic circuit component design as a transmission line model (or a distributed model) when the rise time is less than or approximately equal to the one-way propagation time delay; otherwise, the schematic circuit component design may be modeled by, for example, a lumped analysis.

Another rule may establish a threshold ratio between the rise time and the one-way propagation time delay. For example, a schematic circuit component design may be modeled as a transmission line model or a distributed model when the ration of (rise time/one-way propagation time delay)<a threshold value (e.g., 2, 2.5, etc.) Other criteria may include, for example, physical, electrical, and/or geometric properties of the schematic circuit component design. For example, a wired trace has a lower resistance and thus may swing the comparison between the resistance and the inductive impedance of the schematic circuit component design. Another example may include wire materials. For example, copper wires exhibit lower resistivity and may thus also affect the comparison between the resistance and the inductive impedance of the schematic circuit component design.

Layout device information may be identified (if available) or determined (if non-existing) at 204A for a layout circuit component design corresponding to the identified schematic circuit component design. Some examples of such layout device information may include the propagation speed of a signal in the schematic circuit component design (which may be calculated by dividing the speed of light (C) by the square root of the dielectric constant ($\sqrt{\varepsilon}$) or ($C/\sqrt{\varepsilon}$)), resistance of the schematic circuit component design, impedance of the driving circuit components driving the schematic circuit component design, signal rise time of the schematic circuit component design, one-way propagation time delay of the schematic circuit component design, the three-dimensional (3D) or two-and-half-dimensional (2.5D) geometric characteristics of the schematic circuit component design, capacitance of the schematic circuit component design to the ground or to the substrate, coupling capacitance, self-inductance, current loops that may provide return paths for signals in the layout (e.g., current loops between interconnects, to the substrate, and to the ground, etc.), attributes or characteristics pertaining to proximity effects, attributes or characteristics pertaining to skin effects, or any combinations thereof.

The layout device information may be identified or determined in numerous ways. For example, layout device information of a layout circuit component design may be predetermined and saved in a data structure for subsequent look up; or layout device information may be also extracted from the layout or computed by performing one or more analyses or by using analytical formulae, etc. In some embodiments, the layout device information may be identified or determined at 204A via pre-layout explorations by using, for example, a pre-layout analysis tool that allows critical interface topologies, termination schemes, and I/O (input/output) buffer selection, etc. to be defined and analyzed for synchronous, source-synchronous and clock recovery interfaces to quickly capture an electronic design's exploration space and perform automated analyses. In these embodiments, the layout device information may be more accurately determined than some other estimation methodologies without invoking or having to invoke layout tools to perform more expensive operations such as layout extraction, etc.

A new symbol may be identified at 206A for the identified schematic circuit component design. This new symbol may be modified from an existing circuit symbol (e.g., an existing schematic symbol) in some embodiments or may be generated anew in some other embodiments. Either way, the new symbol includes appropriate interfaces to interconnect the new symbol with the remaining portion of the schematic design in a substantially similar manner to preserve the graphical resemblance of the schematic design and optionally the hierarchical structure thereof.

An extracted view may be generated or updated at 208A for the electronic design at least by replacing the schematic circuit component design with a transmission line model (or with another appropriate distributed model instead of a lumped sub-circuit) in the schematic design. This modified schematic design or a snapshot thereof may be stored as an extracted view for the underlying electronic design.

Because a transmission line model is created in such a way that is understood by analysis modules (e.g., simulation engines such as a SPICE engine), one or more analyses (e.g., electrical simulations) may be performed on an extracted view thus generated to compute and predict the electrical behaviors including the transmission line effects of the underlying electronic design. It shall be noted that the description of FIG. 2A recites a schematic circuit component design for the ease of description and illustration. Nonetheless, the similar techniques may be applied to more than one schematic circuit component design that may exhibit transmission line effects.

With the results of one or more analyses, the electronic design may be updated, modified, or fine-tuned at 210A based in part or in whole upon the results of the one or more analyses to prepare the electronic design or to finalize the electronic design for mask preparation and mask fabrication as well as for tapeout for the eventual manufacturing of the electronic circuits represented by the electronic design.

Figure 2B:
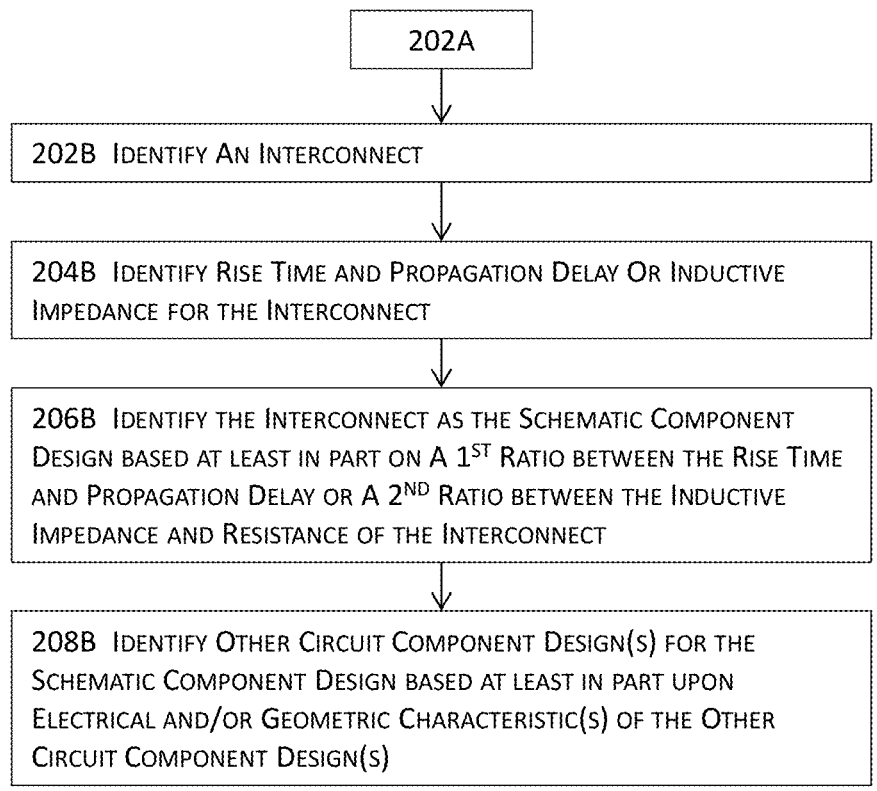
FIG. 2B illustrates more details about a portion of the high level block diagram illustrated in FIG. 2A in one or more embodiments.

FIG. 2B illustrates more details about a portion of the high level block diagram illustrated in FIG. 2A in one or more embodiments. More specifically, FIG. 2B illustrates more details about identifying a schematic circuit component design based at least in part on one or more criteria at 202A of FIG. 2A. It shall be noted that the following description of FIG. 2B recites an interconnect for the schematic circuit component design to be identified at 202A. Nonetheless, the recitation of an interconnect is merely for the ease of description and illustration of a working example and is not intended to limit the scope of the claims or the scope of other embodiments including other types of schematic circuit component designs.

For example, various schematic circuit component designs may be identified at 202A when these schematic circuit component designs satisfy these one or more criteria. One of the objectives of identifying a schematic circuit component design is to determine which schematic circuit component designs are to be modeled as transmission line models. For example, these schematic circuit component designs may include traces, interconnects, interconnect lead wires, wire bonds (e.g., RF IC wire bonds), ground planes, coplanar waveguides, power grids, ground grids, signal nets, clock nets, RF IC (radio frequency integrated circuit) power devices, metal shapes designed to exist in pairs, metal shapes designed to be in a uniform, nominal height to the ground or to the substrate, neighboring signal wires terminated on large impedance, or any combinations thereof, etc.

In these illustrated embodiments, an interconnect may be identified at 202B, and the rise time and the one-way propagation time delay may be identified at 204B. In the alternative, the inductive impedance or the characteristic impedance may be identified at 204BB. The rise time and the one-way propagation time delay may be determined analytically, numerically, empirically, by extraction, or with any other suitable methodologies.

The interconnect identified at 202B may then be identified as the schematic circuit component design based at least in part upon a first ratio between the rise time and the one-way propagation time delay or upon a second ratio between the inductive impedance and the resistance of the interconnect. As described above, a rule including a threshold limit may be imposed on the ratio so that when the first ratio or the second ratio satisfies the rule, the interconnected may be modeled as a transmission line model (or another appropriate distributed model). Otherwise (when the rule is not satisfied), the interconnect may be modeled with a lumped analysis.

One or more other circuit component designs may be identified at 208B based at least in part upon one or more physical, electrical and/or geometric characteristics of these one or more other circuit component designs. These one or more other circuit component designs identified at 208B may be themselves modeled as one or more transmission line models in some embodiments or may be used to determine whether the identified interconnect at 202B is to be modeled as a transmission line model. In an example where an interconnect is determined to be modeled as a transmission line model, one or more neighboring interconnects that are terminated on large impedance may also be identified at 208B as the schematic circuit component design, and these one or more neighboring interconnects may be modeled as one or more transmission line models (or other distributed model(s)).

As another example, the circuit component designs driving the identified schematic circuit component design may also be identified at 208B. More specifically, the impedance of these driving circuit component designs (driving the identified interconnect) may be evaluated to determine whether the interconnect is to be modeled as a transmission line model, despite of other determination to do so elsewhere in the flow. For example, if the impedance of the driving circuit component designs is sufficiently larger (e.g., the impedance of the driving circuit component designs>numeric factor x the resistance of the interconnect where the numeric factor is equal to or greater than one) than the resistance of the identified interconnect, the interconnect may be modeled as a lumped capacitive load. Otherwise, the identified interconnect may be modeled as a transmission line model.

Figure 2C:
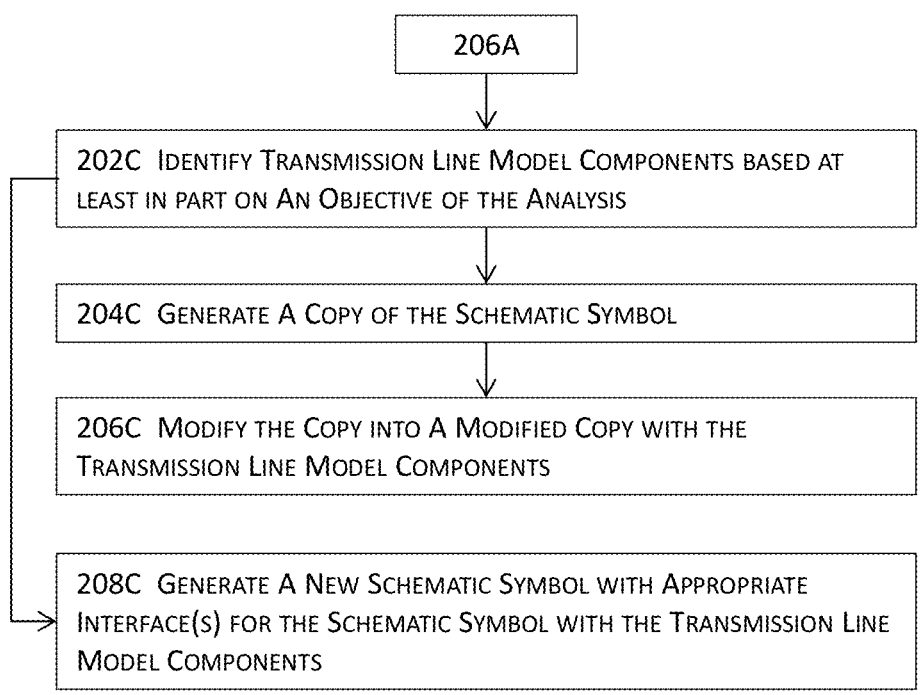
FIG. 2C illustrates more details about another portion of the high level block diagram illustrated in FIG. 2A in one or more embodiments.

FIG. 2C illustrates more details about another portion of the high level block diagram illustrated in FIG. 2A in one or more embodiments. More specifically, FIG. 2C illustrates more details about generating or updating an extracted view with the identified schematic circuit component design. In these illustrated embodiments, one or more transmission line model components may be identified at 202C based at least in part upon an objective of the one or more analyses at 208A. The objective may be used to determine the accuracy requirements for the transmission line model and hence the selection of transmission line model components at 202C. Some examples of transmission line model components include trace segments, bends, joints, etc. and may be identified (e.g., from an existing library of transmission line models and transmission line model components) or constructed based at least in part upon the objective of the one or more analyses.

For example, when the objective of the one or more analyses desires or requires higher accuracy in the predicted electrical behaviors of the underlying electronic design, a more accurate transmission line model and hence its components may be selected. An example is when and where coupling effects may be determined to be negligible in the modeling of a circuit component design as a transmission line model. For more accurate models, a larger separation distance may be used so that the transmission line model incorporates more circuit component designs in determining the coupling effects. On the other hand, a smaller separation distance may be used for less accurate models.

Another example is whether shunt conductance is to be ignored in the modeling of a schematic circuit component design as a transmission line. For less accurate models, the shunt conductance may be ignored for less expensive computation at the expense of lower accuracy. For more accurate models, the shunt conductance may be incorporated for higher accuracy although at the expense of higher computation resource utilization.

Another example is when and where parasitic inductance of wires may be ignored. For analyses that do not require higher accuracy (e.g., concept and feasibility studies, what-if analyses, etc.), the threshold limit for discarding parasitic inductance may be set higher so that fewer circuit components are modeled as transmission line models to conserve computational resource utilization. On the other hand, the threshold limit for discarding parasitic inductance may be set to a lower value so that more interconnects are modeled as transmission line models to more accurately capture the transmission line effects in the underlying electronic design.

A copy of the schematic design may be generated at 204C in some embodiments. Generating a schematic driven extracted view performs various operations on a schematic design. Generating a copy of the schematic design preserves and shields the original schematic from such operations.

The copy of the schematic design may be modified at 206C with the transmission line model components. For example, the identified transmission line model components may be hierarchically placed under the schematic symbol of the identified schematic circuit component design in the copy of the schematic design at 206C in some embodiments. In some other embodiments, the identified transmission line model components may be associated with or bound to the schematic symbol to preserve the original hierarchical structure of the schematic design.

In some other embodiments, a new schematic symbol having appropriate interfaces may be generated at 208C for the transmission line model. In these embodiments, the original schematic symbol may be removed from the schematic design (or a copy thereof). The new schematic symbol may be placed in the schematic design using the appropriate interfaces to interconnect the new schematic symbol with the remaining portion of the schematic design. Those identified transmission line model components may also be hierarchically placed under the new schematic symbol (and may thus add a hierarchical level to the original hierarchical structure) or may be otherwise associated with or bound to the new schematic symbol to preserve the original hierarchical structure of the schematic design.

Figure 2D:
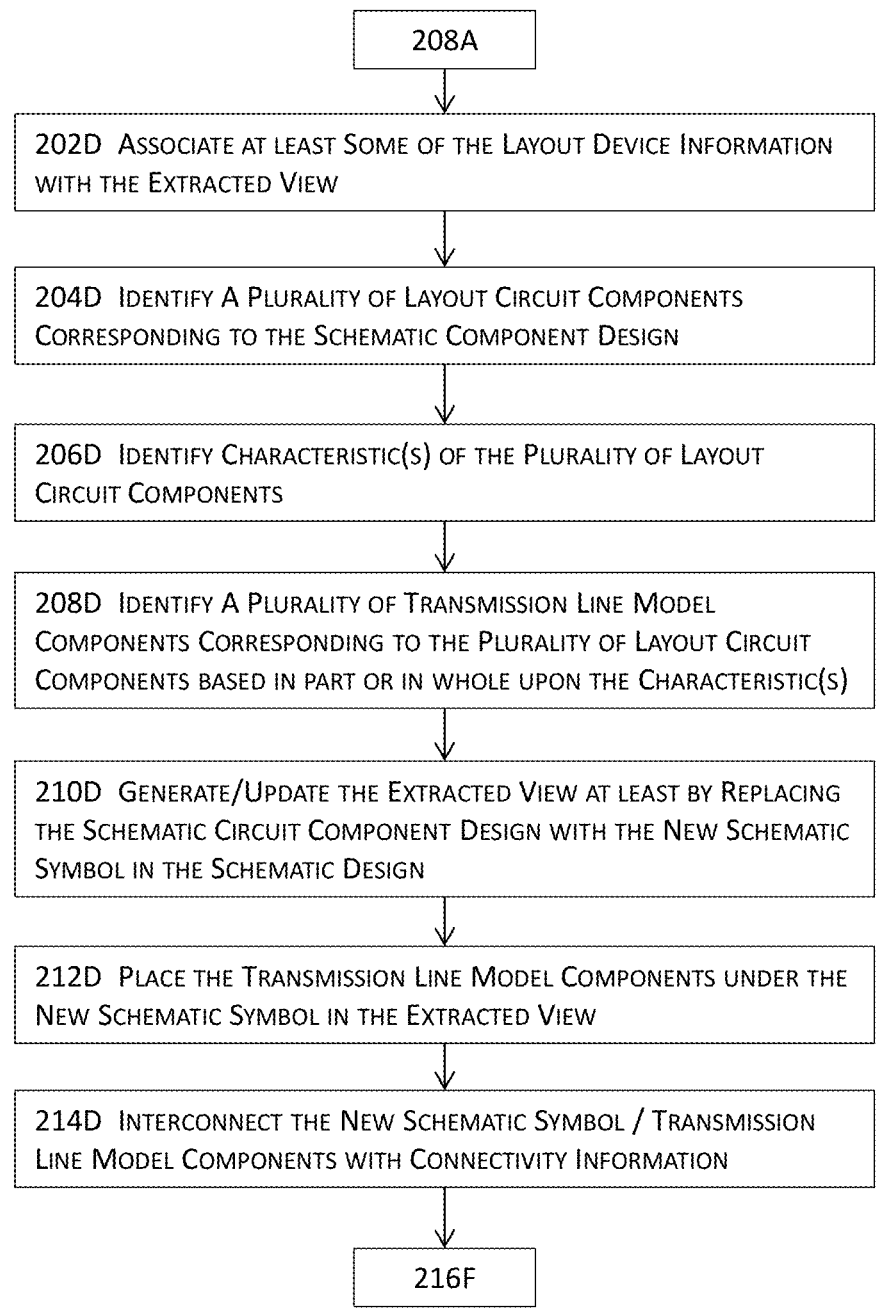
FIGS. 2D-2E jointly illustrate more details about yet another portion of the high level block diagram illustrated in FIG. 2A in one or more embodiments.
Figure 2E:
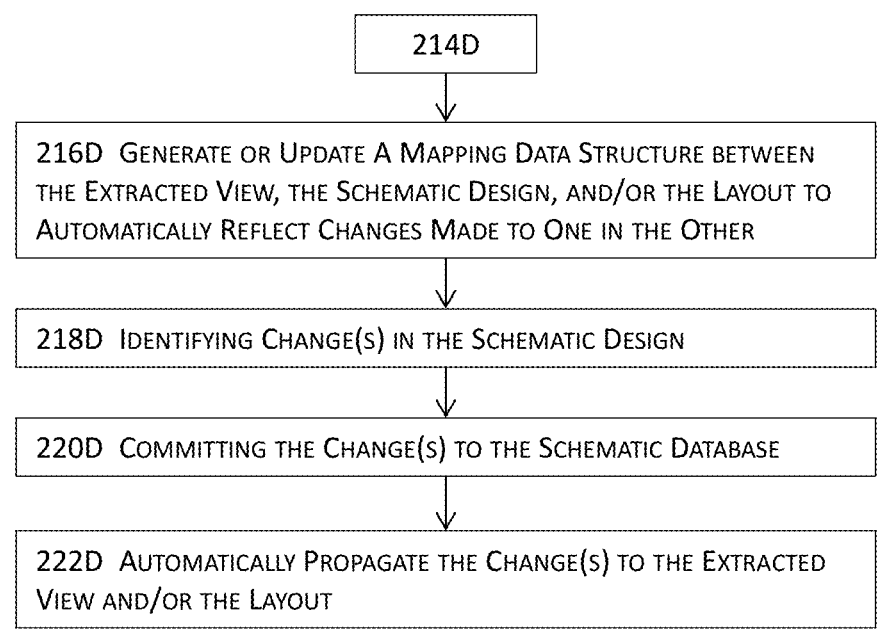

FIGS. 2D-2E jointly illustrate more details about yet another portion of the high level block diagram illustrated in FIG. 2A in one or more embodiments. More specifically, FIGS. 2D-2E illustrate more details about generating or updating an extracted view with a transmission line model. In these illustrated embodiments, at least some of the layout device information may be associated with the extracted view at 202D. In some of these embodiments, the at least some of the layout device information may be associated with or even annotated at the corresponding locations (e.g., node locations) of the schematic circuit component design or of the pertinent transmission line model components that replace the schematic circuit component design in the extracted view.

A plurality of layout shapes corresponding to the schematic circuit component design may be identified at 204D. The plurality of layout circuit component designs may be used to determine which transmission line model components are to be identified for the transmission line model. One or more characteristics of the plurality of layout circuit component designs may be identified at 206D. These one or more characteristics may include, for example, geometric characteristics (e.g., lengths, widths, thicknesses, etc.) of straight segments, bends, various types of joints, etc., and some of which may be identified via extraction, geometric modeling (e.g., 3D or 2.5D modeling), etc.

A plurality of transmission line model components corresponding to the plurality of layout circuit components may be identified at 208D based in part or in whole upon the one or more characteristics identified at 206D. These transmission line model components may be identified from a library of pre-characterized model components without or with necessary modifications in some embodiments, or may be identified with analytical, numerical, and/or empirical methodologies.

The extracted view may be generated or modified from an existing extracted view corresponding to the underlying electronic design at 210D with a new schematic symbol representing the transmission line model in the extracted view. This new schematic symbol may be modified from the schematic symbol of the identified schematic circuit component design in some embodiments or created anew to include appropriate interfaces for interconnecting the new schematic symbol to the remainder of the extracted view.

The new schematic symbol of the transmission line model may be placed in the extracted view; and the plurality of transmission line model components may be placed under the new schematic symbol (at a lower hierarchy) at 212D in some embodiments. In some other embodiments, the plurality of transmission line model components may be associated with or bound to the new schematic symbol to preserve the original hierarchical structure of the corresponding schematic design.

The transmission line model may be interconnected with the corresponding portions of the extracted view at 214D using connectivity information and flight-line segments or orthogonal line segments. In general, schematic connectivity information may suffice, especially for modeling a single interconnect with a transmission line model. In some embodiments, a transmission line model may require additional interfaces to furnish the interconnection. For example, some schematic designs may use a single logical pin in the schematic design, whereas the corresponding layout designs may include multiple physical pins (e.g., devices having vector pins or distributed pins).

In these embodiments, the new schematic symbol (or the transmission line model) may be augmented with appropriate interfaces. This augmentation of interfaces not only serves the purpose of preserving the graphical resemblance among an extracted view, the original schematic design, and the corresponding layout design but also provides the capability of precise probing locations for probing the extracted view (and hence the schematic design through the binding between the schematic design and the extracted view as described below).

A mapping data structure may be generated or updated at 216D. This mapping data structure may store the links, associations, or binding information among the schematic design, the corresponding layout, the extracted view(s), schematic circuit component designs and their respective models, the models and the corresponding layout circuit component designs, etc. This mapping data structure not only stores such binding or association information but also provides users with the capability of automatically populating changes across the schematic design, the layout, and extracted view(s). This mapping data structure also provides users with the capability of probing anywhere in the schematic design, the layout, or the extracted view to access the analytical results obtained by performing one or more analyses on the extracted view.

In addition, an extracted view thus generated with various techniques described herein can be manipulated and edited in an identical or substantially similar manner as that for a schematic design. One or more changes made in the original schematic design after the generation or update of the extracted view has been completed may be identified at 218D. In some embodiments, an extracted view may constitute a snapshot of the modified schematic design (e.g., by replacing schematic circuit component designs with corresponding models) that is stored in some volatile memory (e.g., random access memory).

Because of at least the graphical resemblance between an extracted view and the corresponding schematic design as well as the interconnection using connectivity information, a user may modify the original schematic design with one or more changes to fine-tune the electronic design or to perform some what-if analyses. These one or more changes may be first stored in the volatile memory of a computing system in order to preserve the original schematic design. These one or more changes may nevertheless mature into some desired changes in some cases.

In these cases, these one or more changes may be committed at 220D to a persistent storage device such as the schematic design database. Moreover, the mapping data structure may further be referenced to automatically populate the corresponding changes at 222D to the extracted view or even to the layout. One of the advantages is that these one or more changes may be automatically populated to the extracted view without pushing or having to push corresponding changes to the corresponding layout (assuming the changes do not result in layout topology change) and re-extracting the updated extracted view or a portion thereof from the layout.

Figure 3A:
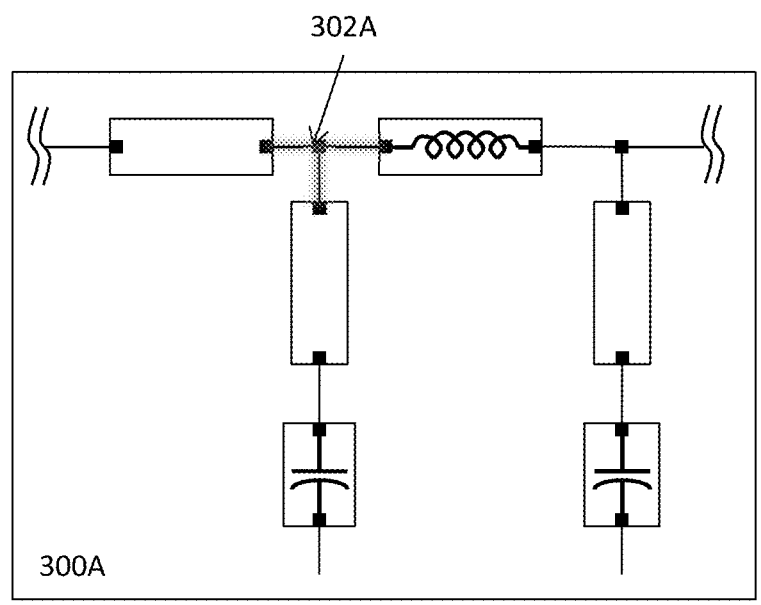
FIG. 3A illustrates an example of a simplified schematic design where a net of interest is to be represented as a transmission line model in one or more embodiments.

FIG. 3A illustrates an example of a simplified schematic design where a net of interest is to be represented as a transmission line model in one or more embodiments. More specifically, FIG. 3A illustrates a schematic design 300A including a net of interest 302A that interconnects three schematic circuit component designs. This net of interest may be identified as a target for transmission line modeling with the techniques described above with reference to FIGS. 2A-2E.

Figure 3B:
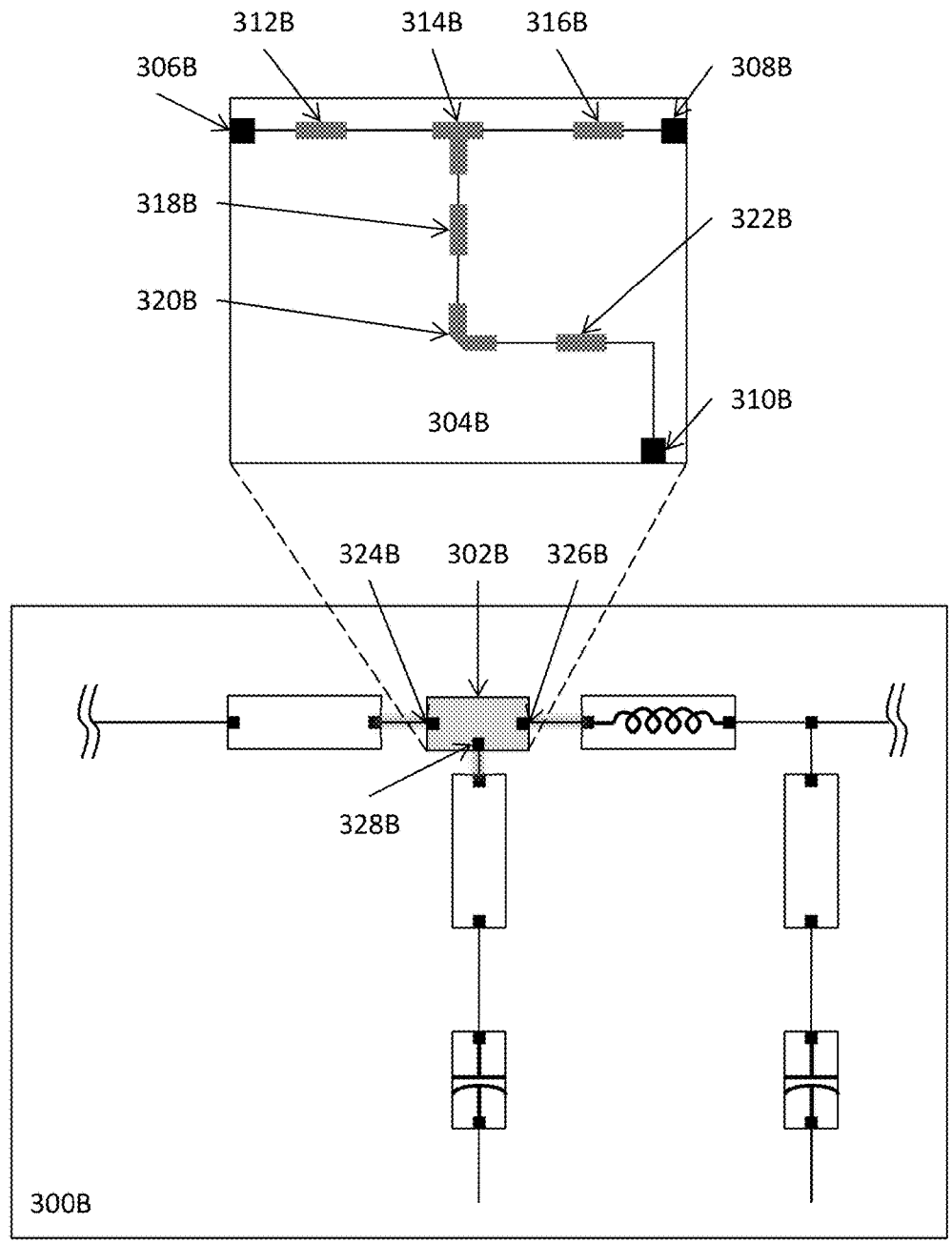
FIG. 3B illustrates a schematic example of a transmission line model and the schematic design illustrated in FIG. 3A with a net of interest replaced by the transmission line model in one or more embodiments.

FIG. 3B illustrates a schematic example of a transmission line model and the schematic design illustrated in FIG. 3A with a net of interest replaced by the transmission line model in one or more embodiments. More specifically, FIG. 3B illustrates an example of an extracted view 300B of the schematic design illustrated in FIG. 3A. In this example, the net of interest 302A is replaced by a transmission line model symbol 302B having three interfaces 324B, 326B, and 328B to interconnect this transmission line model symbol 302B to the corresponding portions of the original schematic design.

FIG. 3B further illustrates an example of the transmission line model 304B that includes three interfaces 306B, 308B, and 310B that respectively correspond to the interfaces 324B, 326B, and 328B on the transmission line model symbol 302B. Moreover, this example transmission line model 304B further includes a plurality of transmission line model components such as straight transmission line segments 312B, 316B, 318B, and 322B, 90-degree bend 320B, and a joint transmission line component 314B. These transmission line model components are graphically interconnected in the transmission line model 304B to indicate their approximate or exact relative locations with each other that may be obtained from the corresponding layout circuit component designs corresponding to the schematic net of interest 302A. In some embodiments, a transmission line model may arrange the transmission line model components according to the corresponding layout topology or even to preserve the layout topology.

Figure 3C:
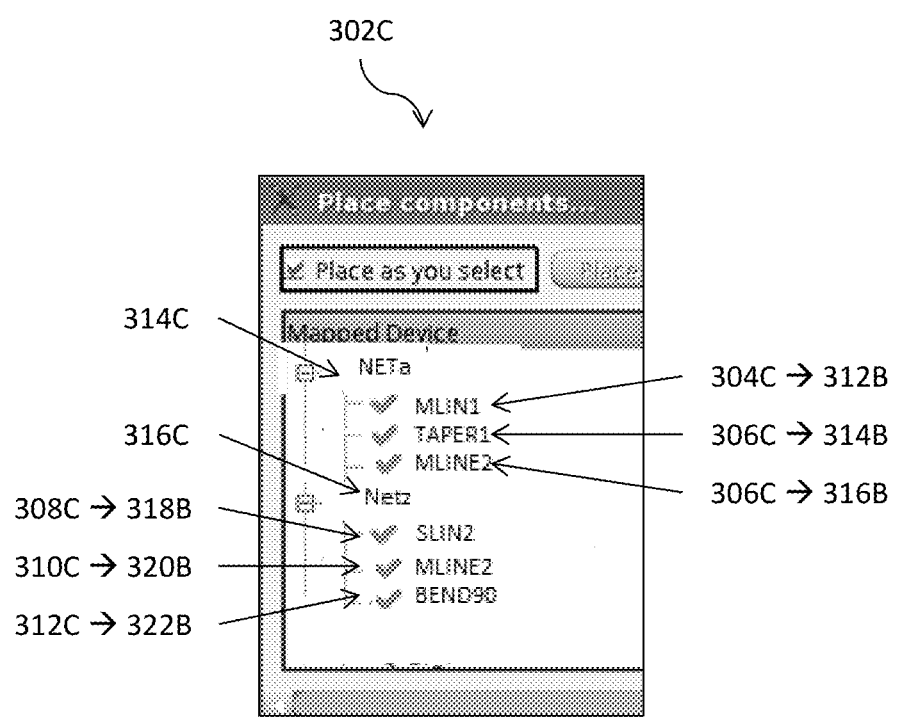
FIG. 3C illustrates an example of an interactive user interface of an interactive model placement module in one or more embodiments.

FIG. 3C illustrates an example of an interactive user interface of an interactive model placement module in one or more embodiments. When combined with the previous example illustrated in FIG. 3B, the interactive user interface 302C shows two nets 314C and 316C as well as their respective constituents. For example, net 314C includes the sub-components 304C (corresponding to component 312B), 306C (corresponding to component 314B), and 308C (corresponding to component 316B); and net 316C includes the sub-components 308C (corresponding to component 318B), 310C (corresponding to component 320B), and 312C (corresponding to component 322B).

Each of the nets or sub-component may be selected from the example interactive user interface 302C for further manipulations (e.g., placement, etc.), and when a net or a sub-component is selected, the corresponding schematic circuit component design may be textually and/or graphically highlighted in the schematic design or the schematic design tree structure (e.g., the schematic design database). Similarly, when a net or a sub-component is selected in the interactive user interface 302C, the corresponding transmission line model component may also be textually and/or graphically highlighted in the transmission line model or the extracted view.

Figure 3D:
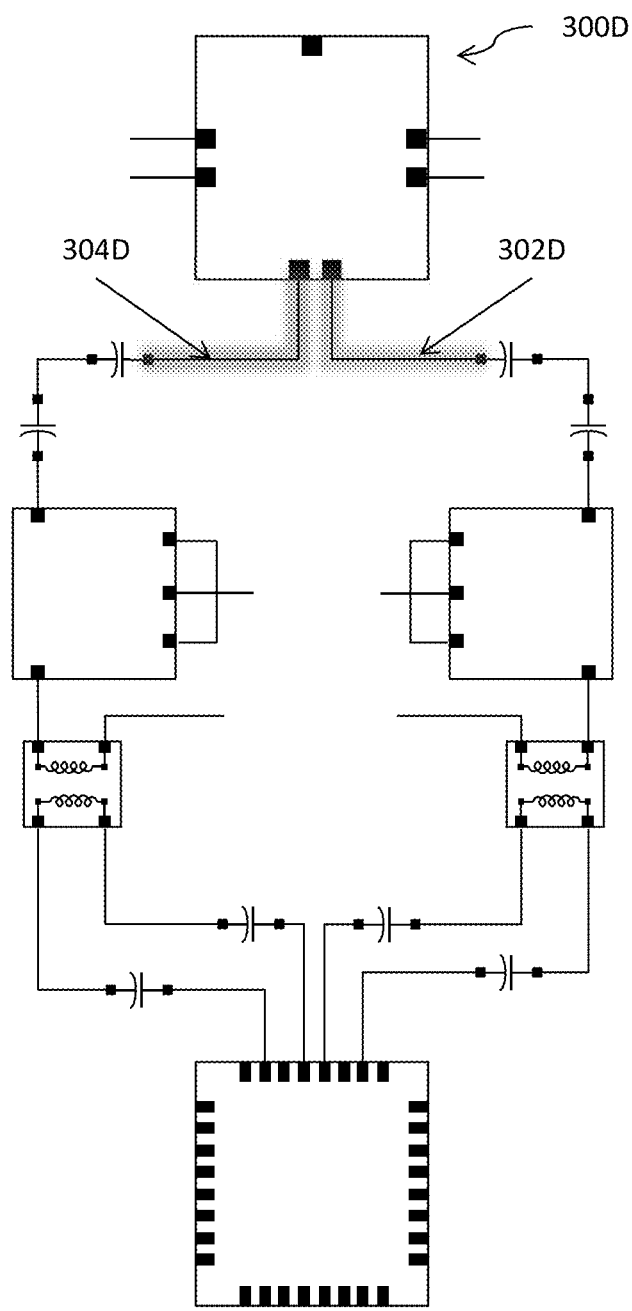
FIG. 3D illustrates an example of a simplified schematic design for which an extracted view is to be generated with at least one transmission line model representing one or more nets of interest in one or more embodiments.

FIG. 3D illustrates an example of a simplified schematic design for which an extracted view is to be generated with at least one transmission line model representing one or more nets of interest in one or more embodiments. More specifically, FIG. 3D illustrates that the simplified electronic design 300D includes two nets of interest 302D and 304D that may be separately or jointly represented in an extracted view. These two nets of interest 302D and 304D may be identified by using identical or substantially similar techniques described above with reference to FIGS. 2A-2E.

Figure 3E:
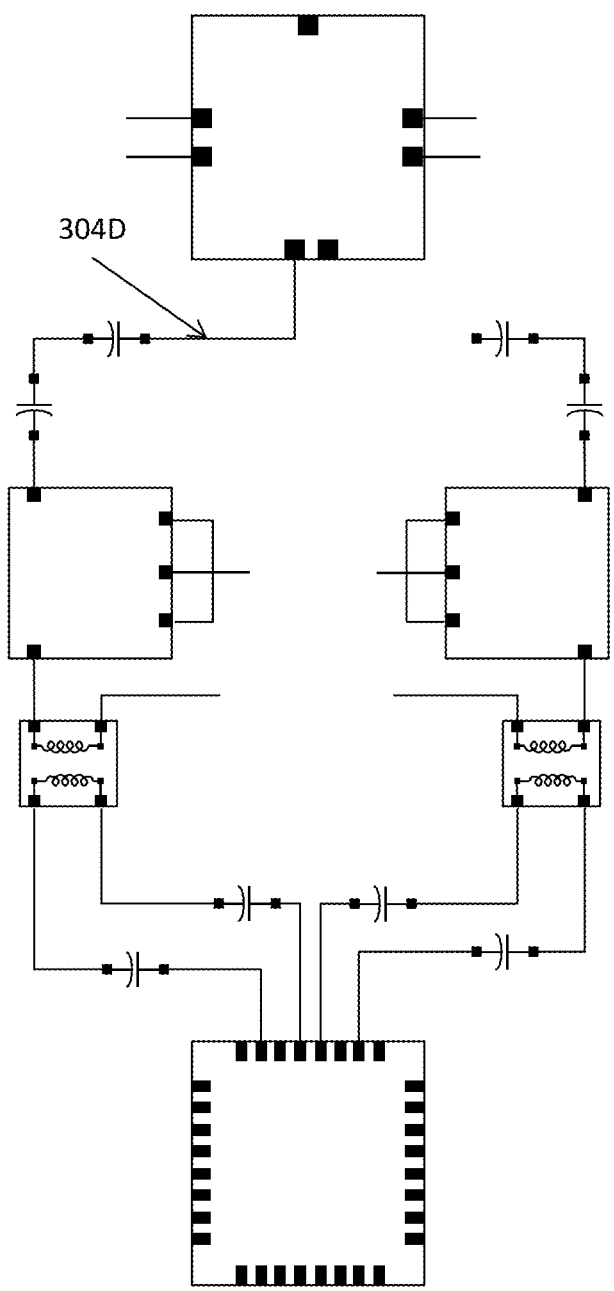
FIG. 3E illustrates an intermediate stage of creating the extracted view with one transmission line model representing a net of interest in the schematic design illustrated in FIG. 3D in one or more embodiments.

FIG. 3E illustrates an intermediate stage of creating the extracted view with one transmission line model representing a net of interest in the schematic design illustrated in FIG. 3D in one or more embodiments. More particularly, FIG. 3E illustrates the intermediate stage where the net of interest 302D, which is to be modeled as a transmission line model, is removed from the schematic design (e.g., a copy of the original schematic design).

Figure 3F:
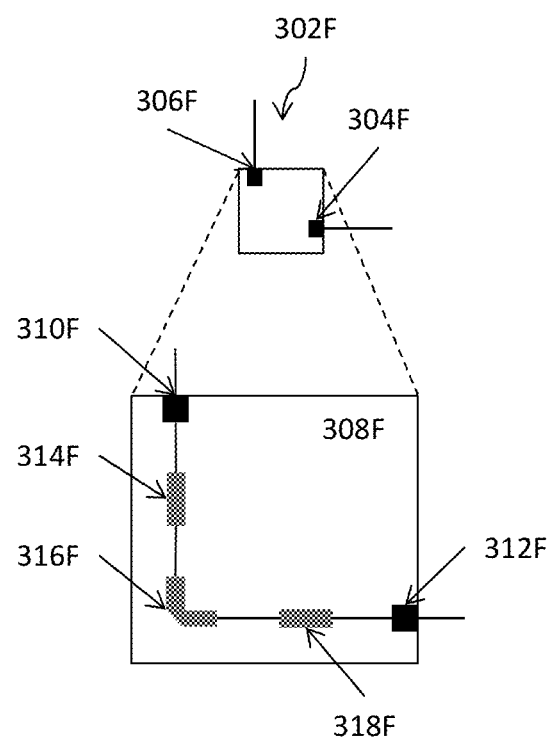
FIG. 3F illustrates an example of a simplified schematic transmission line model that may be used to represent a net of interest in the schematic design illustrated in FIG. 3D in one or more embodiments.

FIG. 3F illustrates an example of a simplified schematic transmission line model that may be used to represent a net of interest in the schematic design illustrated in FIG. 3D in one or more embodiments. More specifically, FIG. 3F shows the symbol 302F that may be used to represent the net of interest 302D in an extracted view. This symbol 302F may be created anew or modified from an existing schematic symbol. Moreover, this symbol 302F includes two interfaces 304F and 306F that may be used to interconnect this symbol to the corresponding portions in the extracted view in such a way to graphically resemble the original schematic design (e.g., 300D in FIG. 3D).

In addition, FIG. 3F further illustrates a simplified example of a transmission line model 308F including two interfaces 310F and 312F that respectively correspond to the interfaces 306F and 304F of the symbol 302F. This simplified example of transmission line model 308F further includes transmission line model components 314F (a straight line segment), 316F (a 90-degree bend), and 318F (another straight line segment) that are interconnected with each other and with the interfaces 310F and 312F.

Figure 3G:
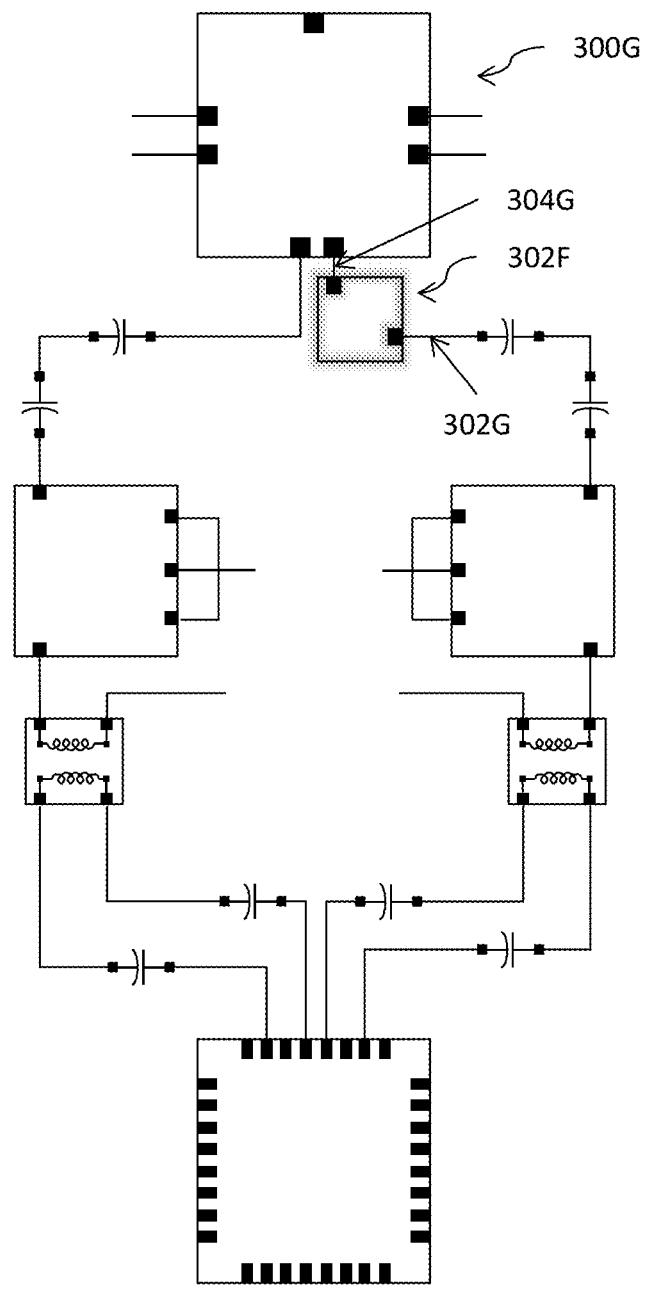
FIG. 3G illustrates an example of an extracted view having the simplified schematic transmission line model representing the net of interest in the schematic design illustrated in FIG. 3D in one or more embodiments.

FIG. 3G illustrates an example of an extracted view having the simplified schematic transmission line model representing the net of interest in the schematic design illustrated in FIG. 3D in one or more embodiments. More specifically, FIG. 3G follows FIG. 3E and illustrates the example where the transmission line model 302F is placed and interconnected with straight flight-line segments 302G and 304G. A snapshot may be taken from this modified schematic design 300G and saved as an extracted view.

Figure 3H:
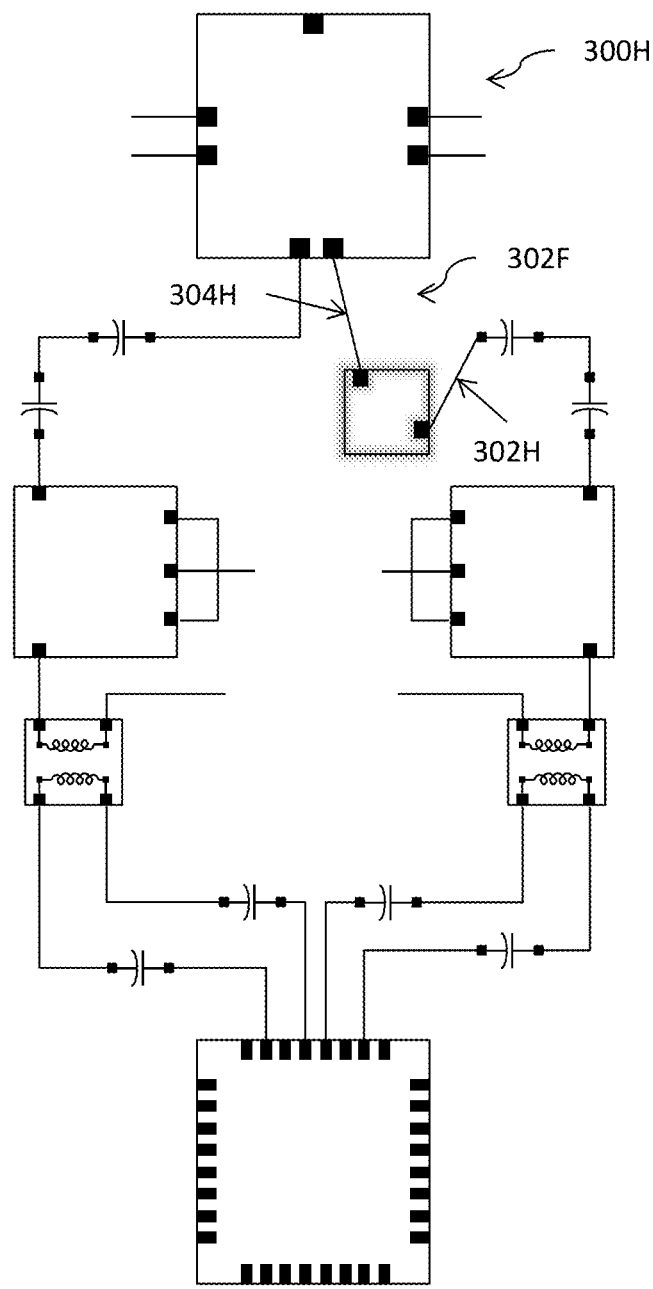
FIG. 3H illustrates an example of another extracted view having the simplified schematic transmission line model representing the net of interest in the schematic design illustrated in FIG. 3D in one or more embodiments.

FIG. 3H illustrates an example of another extracted view having the simplified schematic transmission line model representing the net of interest in the schematic design illustrated in FIG. 3D in one or more embodiments. More specifically, FIG. 3G shows another example where the transmission line model 302F is placed and interconnected with slanted, straight flight-line segments 302H and 304H. These slanted, straight flight-line segments schematically show how the transmission line model 302F is interconnected with the rest of the electronic design. Similarly, a snapshot may be taken from this modified schematic design 300H and saved as another extracted view.

Figure 3I:
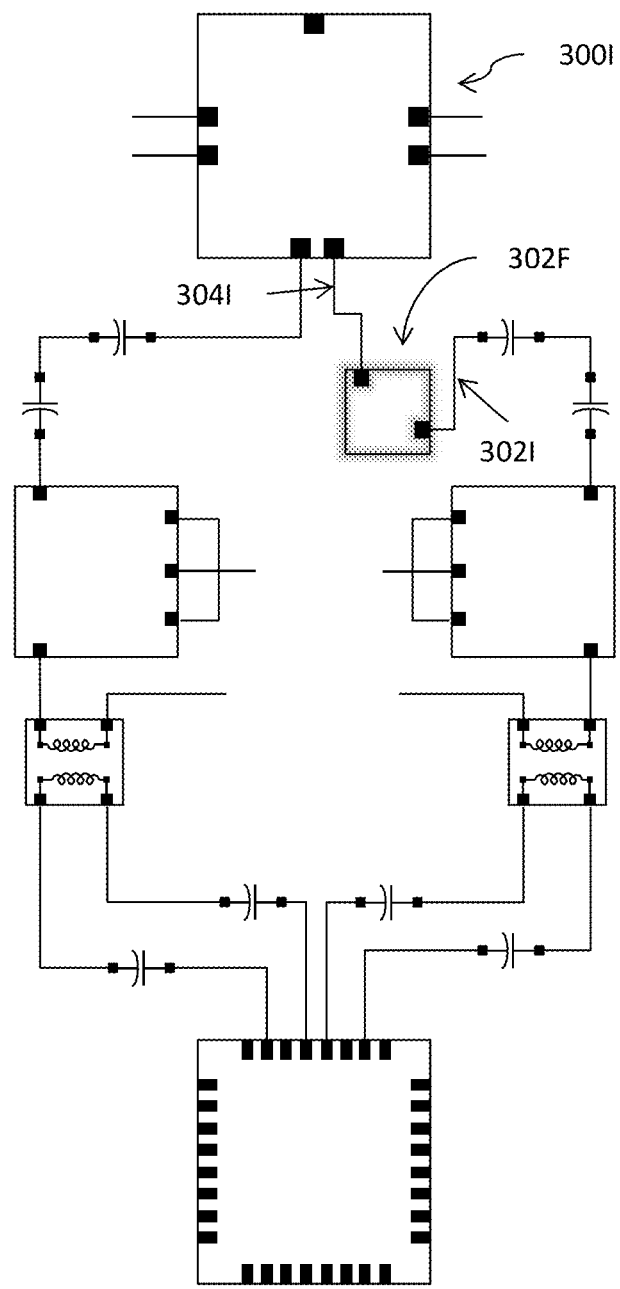
FIG. 3I illustrates an example of yet another extracted view having the simplified schematic transmission line model representing the net of interest in the schematic design illustrated in FIG. 3D in one or more embodiments.

FIG. 3I illustrates an example of yet another extracted view having the simplified schematic transmission line model representing the net of interest in the schematic design illustrated in FIG. 3D in one or more embodiments. More specifically, FIG. 3I shows another example where the transmission line model 302F is placed and interconnected with orthogonal, straight flight-line segments 302I and 304I. These orthogonal, straight flight-line segments also schematically show how the transmission line model 302F is interconnected with the rest of the electronic design in a manner that graphically resembles how a schematic circuit component design is connected in a schematic design. Similarly, a snapshot may be taken from this modified schematic design 300I and saved as another extracted view.

Figure 3J:
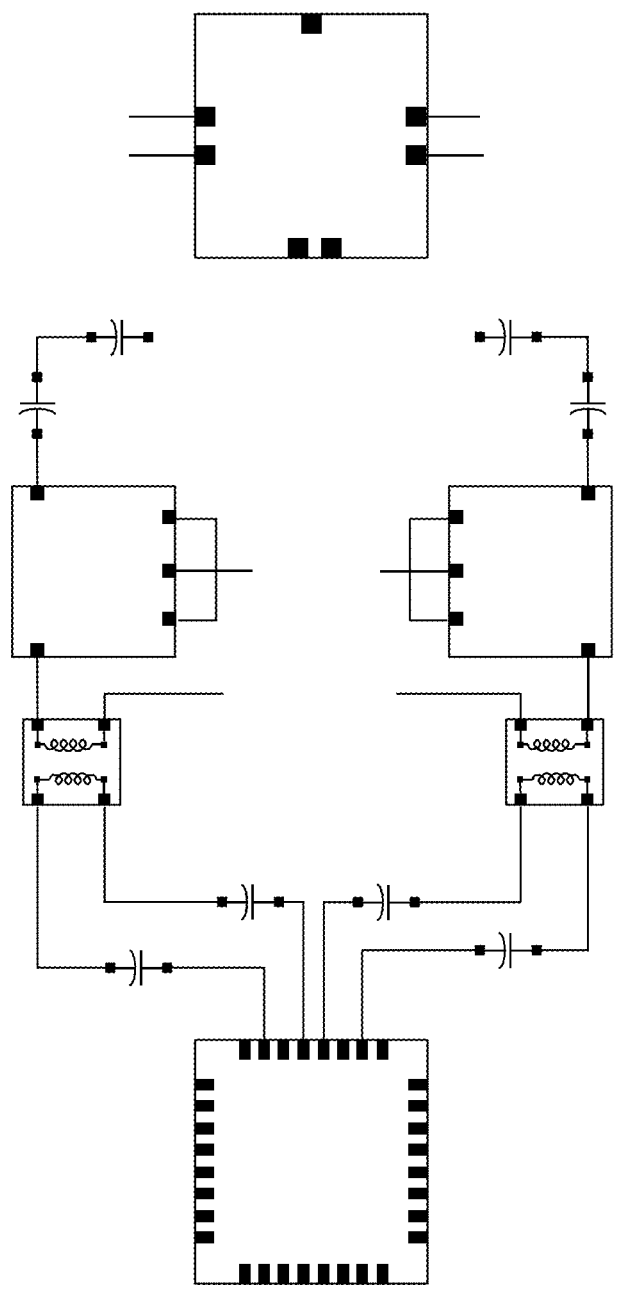
FIG. 3J illustrates an intermediate stage of creating another extracted view with one transmission line model representing two nets of interest in the schematic design illustrated in FIG. 3D in one or more embodiments.

FIG. 3J illustrates an intermediate stage of creating another extracted view with one transmission line model representing two nets of interest in the schematic design illustrated in FIG. 3D in one or more embodiments. More particularly, FIG. 3J illustrates the intermediate stage where both nets of interest 302D and 304D, which are to be modeled as a single transmission line model, are removed from the schematic design (e.g., a copy of the original schematic design).

Figure 3K:
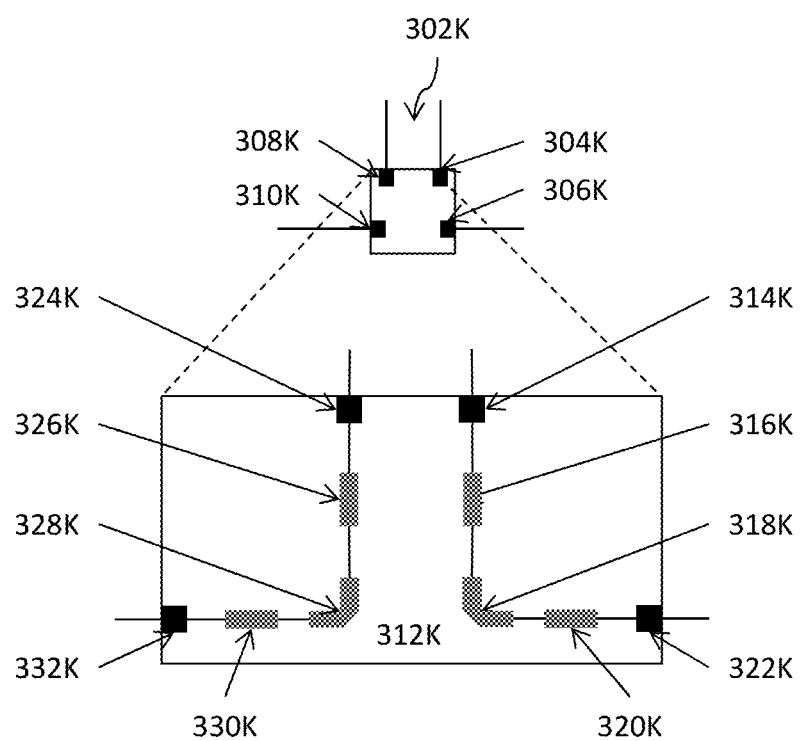
FIG. 3K illustrates an example of another simplified schematic transmission line model that may be used to represent two nets of interest in the schematic design illustrated in FIG. 3D in one or more embodiments.

FIG. 3K illustrates an example of another simplified schematic transmission line model that may be used to represent two nets of interest in the schematic design illustrated in FIG. 3D in one or more embodiments. FIG. 3K illustrates an example of another simplified schematic transmission line model that may be used to represent those two nets of interest 302D and 304D in the schematic design illustrated in FIG. 3J in one or more embodiments. More specifically, FIG. 3K shows the symbol 302K that may be used to represent the nets of interest 302D and 304D in an extracted view. Like symbol 302F, this symbol 302K may be created anew or modified from an existing schematic symbol. Moreover, this symbol 302K includes four interfaces 304K, 306K, 308K, and 310K that may be used to interconnect this symbol 302K to the corresponding portions in the extracted view in such a way that graphically resembles the original schematic design (e.g., 300D in FIG. 3D).

In addition, FIG. 3K further illustrates a simplified example of a transmission line model 312K including four interfaces 314K, 324K, 322K, and 332K that respectively correspond to the interfaces 304K, 306K, 308K, and 310K of the symbol 302K. This simplified example of transmission line model 312K further includes transmission line model components 316K, 320K, 326K, and 330K (as straight line segments) as well as 318K and 328K (as 90-degree bends) that are interconnected with each other and with the interfaces 314K, 322K, 324K, and 332K.

Figure 3L:
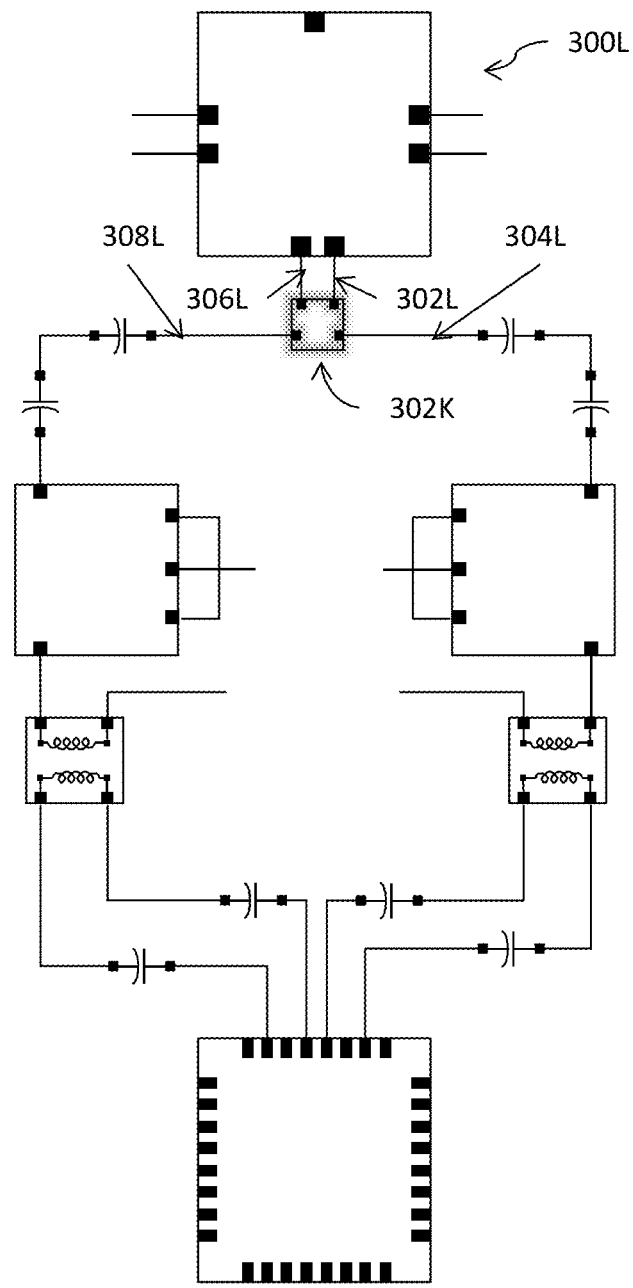
FIG. 3L illustrates an example of another extracted view having the simplified schematic transmission line model representing the two nets of interest in the schematic design illustrated in FIG. 3D in one or more embodiments.

FIG. 3L illustrates an example of another extracted view having the simplified schematic transmission line model representing the two nets of interest in the schematic design illustrated in FIG. 3D in one or more embodiments. More specifically, FIG. 3L follows FIG. 3J and illustrates the example where the transmission line model 302K is placed and interconnected with straight flight-line segments 302L, 304L, 306L, and 308L. A snapshot (e.g., a schematic database view) may be taken from this modified schematic design 300L and saved as an extracted view.

In some embodiments described herein, a model that is used to replace one or more nets or one or more net segments includes a transmission line model, instead of a SPICE model, an s-parameter model, or an IBIS model. In these embodiments, these one or more nets or one or more net segments as well as one or more bends are inserted or placed in the schematic design based at least in part upon the topology of the corresponding nets or net segments, while the topology of these nets or net segments is preserved to the extent possible with minimal or reduced disruption of the original layout topology.

Similar to the SPICE models or s-parameter models for nets or net segments, these transmission line models are also understood by simulation engines. Unlike the SPICE models or s-parameter models for nets or net segments, these transmission line models need much less computational resources to obtain, whereas SPICE models and s-parameter models often need much more computational resources and take much longer time to determine.

Any transmission line model may be associated with the corresponding net(s) or net segment(s) in the schematic design as well as the corresponding net(s) or net segment(s) in the layout. Therefore, a change made to one net or net segment in one may be automatically reflected in the others. Moreover, a transmission line model may be constructed and inserted into a schematic design in lieu of the original nets or net segments while preserving the hierarchical structure of the schematic design.

A transmission line model may also be bound to or associated with a SPICE model, an s-parameter model, or both so that a simulation engine may take the bound or associated SPICE model or the s-parameter model, instead of the transmission line model, during simulation in order to predict the electrical behaviors more accurately than using the transmission line model as the input. Therefore, designers may choose which model is to be used for a simulation engine for any net or net segment based at least in part upon, for example, the required or desired accuracy of predicted electrical behaviors, criticality of a net or net segment, availability of computational resources, objectives of the simulation, time constraint, or any other suitable factors.

Similar to the other models representing various schematic circuit design components, a symbol having appropriate interfaces may be created for a transmission line model; and the symbol may be placed or inserted into the schematic design to replace the original schematic circuit design component for the generation of an extracted view. The transmission line member elements in the transmission line model may then be placed in the schematic design as hierarchical schematic transmission lines under this symbol for the generation of an extracted view.

In addition to the advantages described herein, another advantage of various embodiments described herein is that with these extracted views having the newly defined models, instead of conventional SPICE models or s-parameters, layout component designs or at least information thereof are incorporated into these models and hence the extracted view. Furthermore, cross reference, associations, or binding is established between extracted views, the layout or a portion thereof, and the schematic or a portion thereof so that any change effected in one will be automatically reflected in the others. More importantly, these advantages may be realized without even invoking any layout editors. This advantage is especially prominent in multi-fabric electronic designs that span across multiple design fabrics (e.g., PCB design fabric, IC package design fabric, IC design fabric, etc.)

System Architecture Overview

Figure 4:
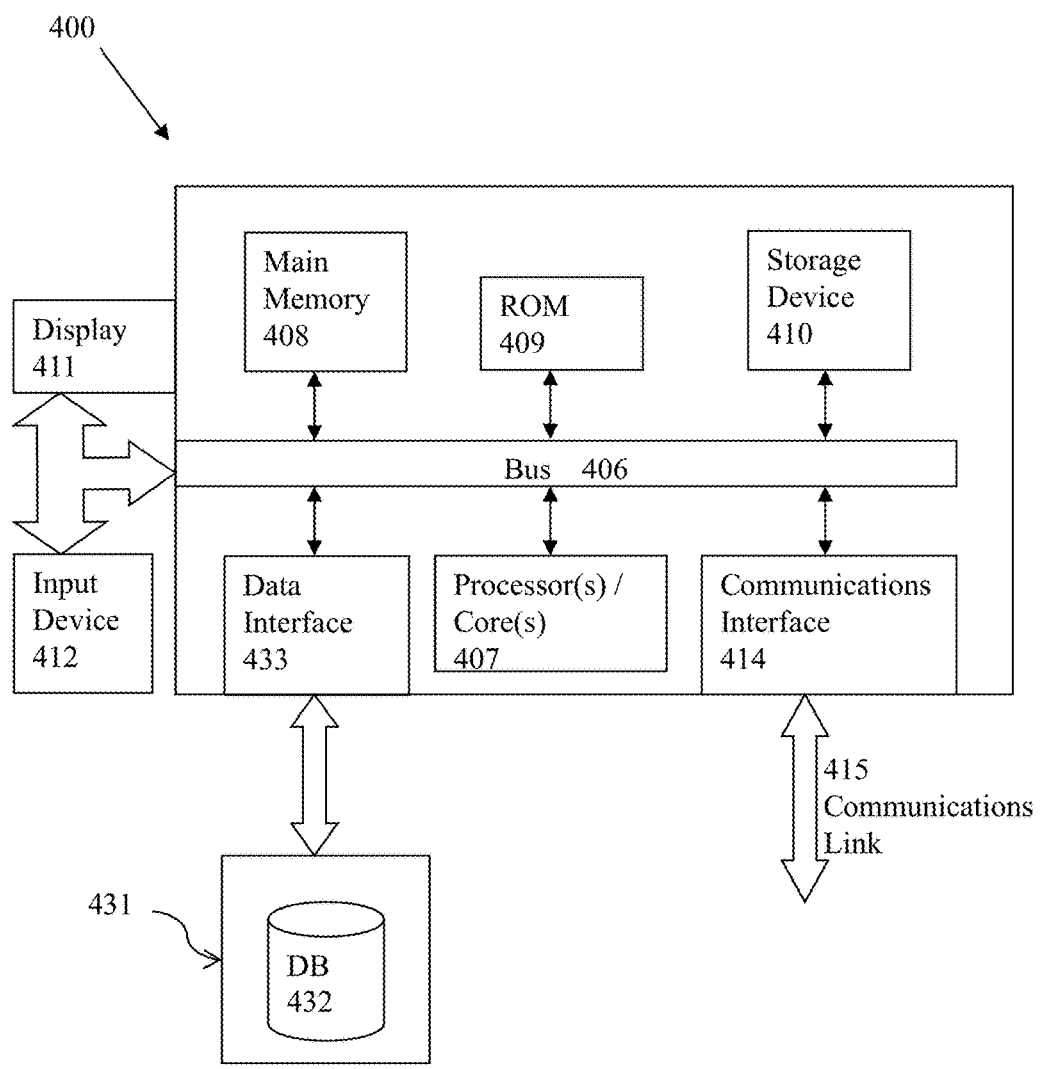
FIG. 4 illustrates a computerized system on which a method for implementing a net as a transmission line model in a schematic driven extracted view for an electronic design may be implemented.

FIG. 4 illustrates a computerized system on which a method for implementing a net as a transmission line model in a schematic driven extracted view for an electronic design may be implemented. Computer system 400 includes a bus 406 or other communication module for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown). The illustrative computing system 400 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 400 may include or may be a part of a cloud computing platform in some embodiments.

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program (e.g., application code) through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a schematic circuit design component as a transmission line model in a schematic driven extracted view for an electronic design, comprising:
   identifying a schematic circuit component design from a schematic design of an electronic design;
   identifying or determining layout device information of a layout circuit component design corresponding to the schematic circuit component design;
   generating or updating, at a transmission line module stored at least partially in memory of and functioning in conjunction with a microprocessor of a computing system, an extracted view for the electronic design at least by using a transmission line model based in part or in whole upon connectivity information or a hierarchical structure of the electronic design; and
   updating the electronic design based in part or in whole upon results of performing one or more analyses on the extracted view with the transmission line model.

2. The computer implemented method of claim 1, further comprising:
   identifying a new symbol with appropriate interfaces for representing the schematic circuit component design in the extracted view; and
   performing, at one or more analysis engines that function in tandem with the at least one microprocessor of the computing system, the one or more analyses on the extracted view.

3. The computer implemented method of claim 2, identifying the new symbol comprising:
   identifying a plurality of transmission line model components for the schematic circuit component design;
   generating a copy of a schematic symbol of the schematic circuit component design;
   modifying the copy of the schematic symbol into the new symbol with appropriate interfaces; and
   placing the plurality of transmission line model components under the new symbol in the extracted view or associating the plurality of transmission line model components with the new symbol.

4. The computer implemented method of claim 2, identifying the new symbol comprising:
   identifying a plurality of transmission line model components for the schematic circuit component design;
   generating a new schematic symbol for representing the schematic circuit component design in the extracted view; and
   placing the plurality of transmission line model components under the new schematic symbol in the extracted view or associating the plurality of transmission line model components with the new schematic symbol.

5. The computer implemented method of claim 1, identifying the schematic circuit component design comprising:
   identifying an interconnect from the schematic design; and
   identifying one or more characteristics of the interconnect, the one or more characteristics comprising signal rise time, one-way signal propagation time delay, an inductive impedance, or a resistance.

6. The computer implemented method of claim 5, identifying the schematic circuit component design comprising:
   identifying the interconnect as the schematic circuit component design based at least in part upon a first ratio between the rise time and one-way signal propagation time delay or a second ratio between the inductive impedance and the resistance of the interconnect; and
   identifying one or more other schematic circuit component designs for the schematic circuit component design based at least in part upon one or more electrical characteristics, one or more geometric characteristics, or one or more physical characteristics of the one or more other schematic circuit component designs.

7. The computer implemented method of claim 1, generating or updating the extracted view comprising:
   associating at least a part of the layout device information with the extracted view; and
   identifying one or more circuit component designs corresponding to the schematic circuit component design.

8. The computer implemented method of claim 7, generating or updating the extracted view comprising:
   identifying one or more characteristics of the one or more layout circuit component designs;
   identifying a plurality of transmission line model components corresponding to the one or more layout circuit component designs based in part or in whole upon the one or more characteristics of the one or more layout circuit component designs; and
   generating or updating the extracted view at least by replacing the schematic circuit component design with a new schematic symbol in the schematic design.

9. The computer implemented method of claim 8, generating or updating the extracted view comprising:
   placing the plurality of transmission line model components under the new schematic symbol or associating the plurality of transmission line model components with the new schematic symbol; and
   interconnecting the new schematic symbol or the plurality of transmission line model components with connectivity information.

10. The computer implemented method of claim 9, generating or updating the extracted view comprising:
    generating or updating a mapping data structure between at least two of the schematic design, the extracted view, a layout of the electronic design, the new schematic symbol of the transmission line model, the plurality of transmission line model components, the schematic circuit component design, or the one or more layout circuit component designs.

11. A system for implementing a schematic circuit design component as a transmission line model in a schematic driven extracted view for an electronic design, comprising:
    non-transitory computer accessible storage medium storing thereupon program code;
    at least one micro-processor of one or more computing systems that is configured to execute the program code to identify a schematic circuit component design from a schematic design of an electronic design;
    the at least one micro-processor of one or more computing systems that is further configured to execute the program code to identify or determine layout device information of a layout circuit component design corresponding to the schematic circuit component design;
    a transmission line module that is stored at least partially in memory of the one or more computing systems, includes or functions in conjunction with the at least one micro-processor of the one or more computing systems, and is configured to execute the program code to generate or update an extracted view for the electronic design at least by using a transmission line model based in part or in whole upon connectivity information or a hierarchical structure of the electronic design; and
the at least one micro-processor of one or more computing systems further configured to update the electronic design based in part or in whole upon results of performing one or more analyses on the extracted view with the transmission line model.

12. The system for claim 11, the at least one microprocessor further executing the program code to identify a new symbol with appropriate interfaces for representing the schematic circuit component design in the extracted view, and the system further comprising:
one or more analysis engines that are stored at least partially in the memory of and function in tandem with the at least one microprocessor of the computing system, the one or more analysis engines configured to perform the one or more analyses on the extracted view.

13. The system for claim 11, the at least one microprocessor further executing the program code to:
identify a plurality of transmission line model components for the schematic circuit component design;
generate a copy of a schematic symbol of the schematic circuit component design;
modify the copy of the schematic symbol into the new symbol with appropriate interfaces; and
place the plurality of transmission line model components under the new symbol in the extracted view or associating the plurality of transmission line model components with the new symbol.

14. The system for claim 11, wherein the at least one microprocessor executing the program code to identify the schematic circuit component design further executes the program code to:
identify an interconnect from the schematic design; and
identify one or more characteristics of the interconnect, the one or more characteristics comprising signal rise time, one-way signal propagation time delay, an inductive impedance, or a resistance.

15. The system for claim 14, wherein the at least one microprocessor executing the program code to identify the schematic circuit component design further executes the program code to:
identify the interconnect as the schematic circuit component design based at least in part upon a first ratio between the rise time and one-way signal propagation time delay or a second ratio between the inductive impedance and the resistance of the interconnect; and
identify one or more other schematic circuit component designs for the schematic circuit component design based at least in part upon one or more electrical characteristics, one or more geometric characteristics, or one or more physical characteristics of the one or more other schematic circuit component designs.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing a schematic circuit design component as a transmission line model in a schematic driven extracted view for an electronic design, the set of acts comprising:
identifying a schematic circuit component design from a schematic design of an electronic design;
identifying or determining layout device information of a layout circuit component design corresponding to the schematic circuit component design;
generating or updating, at a transmission line module stored at least partially in memory of and functioning in conjunction with a microprocessor of a computing system, an extracted view for the electronic design at least by using a transmission line model based in part or in whole upon connectivity information or a hierarchical structure of the electronic design; and
updating the electronic design based in part or in whole upon results of performing one or more analyses on the extracted view with the transmission line model.

17. The article of manufacture of claim 16, the set of acts further comprising:
associating at least a part of the layout device information with the extracted view; and
identifying one or more circuit component designs corresponding to the schematic circuit component design.

18. The article of manufacture of claim 17, the set of acts further comprising:
identifying one or more characteristics of the one or more layout circuit component designs;
identifying a plurality of transmission line model components corresponding to the one or more layout circuit component designs based in part or in whole upon the one or more characteristics of the one or more layout circuit component designs; and
generating or updating the extracted view at least by replacing the schematic circuit component design with a new schematic symbol in the schematic design.

19. The article of manufacture of claim 18, the set of acts further comprising:
placing the plurality of transmission line model components under the new schematic symbol or associating the plurality of transmission line model components with the new schematic symbol; and
interconnecting the new schematic symbol or the plurality of transmission line model components with connectivity information.

20. The article of manufacture of claim 19, the set of acts further comprising:
generating or updating a mapping data structure between at least two of the schematic design, the extracted view, a layout of the electronic design, the new schematic symbol of the transmission line model, the plurality of transmission line model components, the schematic circuit component design, or the one or more layout circuit component designs.

* * * * *